United States Patent
Schaeffer et al.

(10) Patent No.: US 11,970,939 B2
(45) Date of Patent: Apr. 30, 2024

(54) MACHINE LEARNING ANALYSIS OF LOW-FREQUENCY SIGNAL DATA IN FRACTURING OPERATIONS

(71) Applicant: Halliburton Energy Services, Inc., Houston, TX (US)

(72) Inventors: Benjamin Schaeffer, Centennial, CO (US); Mikko K. Jaaskelainen, Houston, TX (US); Richard Gibson, Littleton, CO (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 186 days.

(21) Appl. No.: 17/866,231

(22) Filed: Jul. 15, 2022

(65) Prior Publication Data
US 2024/0018866 A1    Jan. 18, 2024

(51) Int. Cl.
| | |
|---|---|
| E21B 49/00 | (2006.01) |
| E21B 43/26 | (2006.01) |
| G01L 1/24 | (2006.01) |
| G01V 1/22 | (2006.01) |
| G06T 7/90 | (2017.01) |

(52) U.S. Cl.
CPC .............. *E21B 49/00* (2013.01); *E21B 43/26* (2013.01); *G01L 1/242* (2013.01); *G01V 1/226* (2013.01); *G06T 7/90* (2017.01); *G06F 2218/08* (2023.01); *G06F 2218/12* (2023.01); *G06T 2207/20081* (2013.01); *G06T 2207/20084* (2013.01)

(58) Field of Classification Search
CPC ......... E21B 49/00; E21B 43/26; G01L 1/242; G01V 1/226; G01V 2210/1234; G01V 2210/646; G06T 7/90; G06T 2207/20081; G06T 2207/20084; G06F 2218/08; G06F 2218/12

See application file for complete search history.

(56) References Cited

U.S. PATENT DOCUMENTS

| | | | |
|---|---|---|---|
| 11,111,781 B2 * | 9/2021 | Tubel | E21B 47/00 |
| 2020/0309982 A1 | 10/2020 | Jin et al. | |
| 2021/0131254 A1 * | 5/2021 | Potty | C09K 8/62 |
| 2022/0112796 A1 | 4/2022 | Jaaskelainen et al. | |
| 2022/0325621 A1 * | 10/2022 | Moos | E21B 43/26 |
| 2024/0018866 A1 * | 1/2024 | Schaeffer | G01V 1/226 |
| 2024/0036274 A1 * | 2/2024 | Jaaskelainen | E21B 47/09 |

FOREIGN PATENT DOCUMENTS

WO    WO-2024025542 A1 *    2/2024    ............. E21B 47/09

* cited by examiner

*Primary Examiner* — Daniel Pihulic
(74) *Attorney, Agent, or Firm* — NOVAK DRUCE CARROLL LLP

(57) ABSTRACT

Aspects of the subject technology relate to systems, methods, and computer-readable media for machine learning analysis of low-frequency signal data in fracturing operations. The present technology can receive strain data associated with a monitoring well that is proximate to a treatment well. The strain data can comprise information representing a fracturing operation associated with the treatment well. Further, the present technology can convert the strain data into image data where a color scale corresponds to a degree of strain observed by a fiber optic cable deployed in the monitoring well. As follows, the present technology can provide the image data to a machine-learning model, which is configured to identify one or more features in the image data.

20 Claims, 7 Drawing Sheets

MACHINE LEARNING ANALYSIS OF LOW-FREQUENCY SIGNAL DATA IN FRACTURING OPERATIONS

TECHNICAL FIELD

The present technology relates to solutions for identifying fracturing events from signal data associated with a fracturing operation, and more particularly, to the use of machine learning classification methods for processing low-frequency Distributed Acoustic Sensing (DAS) data associated with fracturing operations.

BACKGROUND

Hydraulic fracturing (i.e., fracking) is the process of injecting fluids through a well at a high pressure to create new fractures or enlarge any existing fractures to stimulate the production and extraction of oil or natural gas from subterranean formations. The injected fluids often carry particulate matters to be deposited in the fractures and prop the fractures open when the pressure returns to normal. Such fractures substantially increase the permeability of the formation so that fluids can flow from the formation into the well.

Offset well fracture stimulations employ a monitoring well, which is spaced apart from the fracturing well (i.e., treatment well) so that sensors positioned in the monitoring well can monitor strain events of fractures propagating from the treatment well towards the monitoring well. Strain measurements observed by the monitoring well can be used to characterize hydraulic fractures during the fracturing operation of the treatment well.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
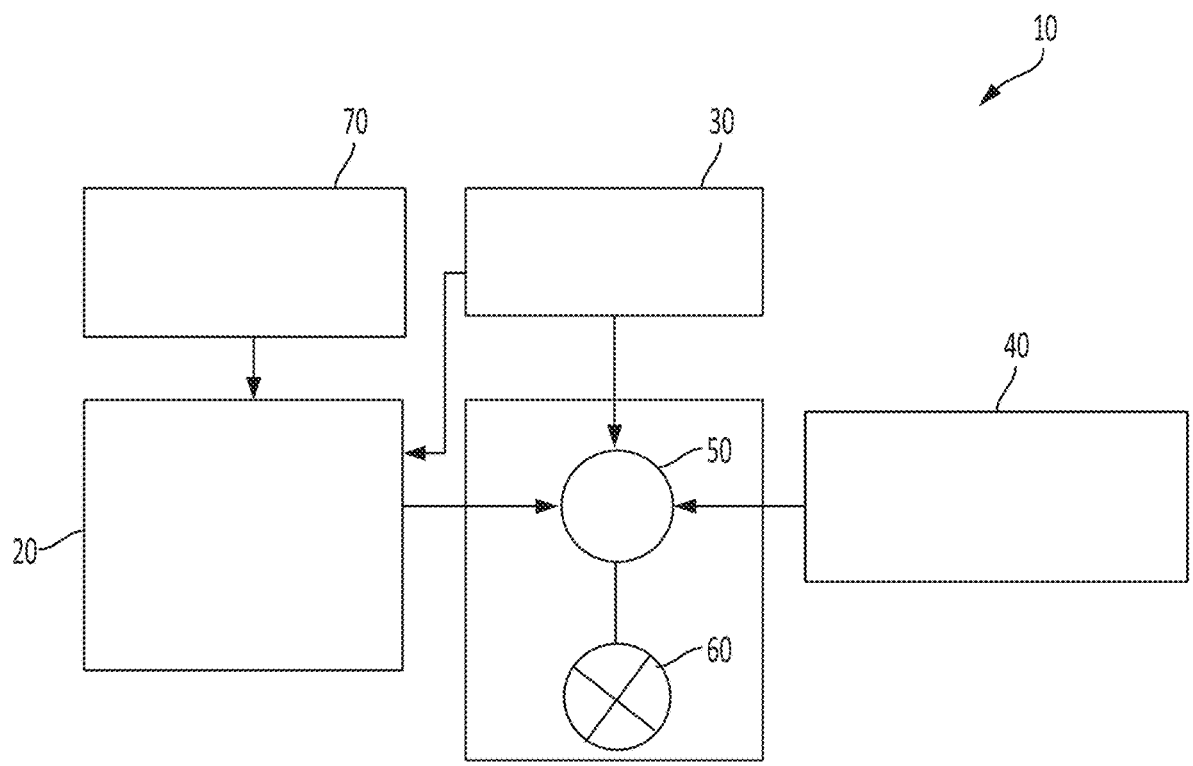
FIG. 1 is a schematic diagram of an example fracturing system, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As noted, subterranean hydraulic fracturing is conducted to increase or "stimulate" production from a hydrocarbon well. To conduct a fracturing process, pressure is used to pump special fracturing fluids, including some that contain proppants, down-hole and into a hydrocarbon formation to split or "fracture" the rock formation along veins or planes extending from the wellbore. Once the desired fracture is formed, the fluid flow is reversed and the liquid portion of the fracturing fluid is removed.

During the fracturing process at a fracturing well (i.e., a treatment well or an injection well), nearby wells can be impacted by the fractures propagating outwards from the fracturing well. For example, a fracture created from a fracturing well can interact with a neighbor well 100's to 1,000's feet away and induces deformation, referred to as strain, in the rock surrounding the neighbor well. Oilfield operators have deployed fiber-optic sensing (FOS) technology with an offset well (also referred to as a monitoring well or a child well), which is located proximate to the fracturing well. The technological development of distributed acoustic sensing (DAS) data has provided a significant uplift in the monitoring of hydraulic fracture stimulations. The monitoring well or offset well equipped with a fiber optic cable (e.g., a DAS cable) can record fracture strain developments during the fracturing operation in the form of low-frequency DAS data. Understanding the fracture propagation such as fracture characteristics or geomechanics of fractures is critical for oilfield operators to utilize favorable geological conditions to optimize the fracturing operation.

A conventional method of determining these features has been a manual process that requires a trained analyst, which can be subjective and inefficient. Therefore, there exists a need for a machine learning model that, when provided with low-frequency DAS data, can automatically identify these features in a consistent and real-time manner.

The present technology includes systems, methods, and computer-readable media for solving these problems and discrepancies, among others. In some examples, systems, methods, and computer-readable media are provided for a machine learning process of low-frequency DAS data to identify one or more features associated with a fracturing operation. As follows, the outputted features can provide input for comparative analytics of hydraulic fracture completion well and strain inversions and diagnostics targeted at real-time optimization of pumping parameters.

In various embodiments, a method includes receiving strain data (e.g., at a fiber optic cable) that is associated with a monitoring well that is proximate to a treatment well. In some aspects, the fiber optic cable can be part of a DAS system. The strain data can include information representing fracturing operations associated with the treatment well, and can be a two-dimensional measurement of strain rate with respect to measured depth and time. In some implementations, the strain data can be converted into an image data format. By using an image data format, a color scale of the image data can be used to represent a degree of strain observed by a fiber optic cable deployed in the monitoring well. The image data can then be provided to a machine-learning model, which is configured to identify (or detect) one or more features in the image data. Additionally, a time when a fracture propagating from the treatment well intersects with the monitoring well can be identified. By utilizing a machine-learning model to perform event detection on the strain data, various fracturing events can be automatically determined, e.g., in real-time or near real-time, thereby permitting them to be surfaced for actionable review by a wellbore operator.

Additionally, converting the strain data into image data can include parsing the strain data to identify different stages of fracture propagation based on the degree of strain observed by the fiber optic cable. Converting the strain data into image data can further include integrating the strain data over a predetermined time length. In some aspects, converting the strain data into the image data can include applying a sliding window that slides across the strain data according to a specified depth interval.

Furthermore, the machine-learning model has been trained using a set of low-frequency strain data collected from one or more fiber optic cables that are part of a DAS system.

Also, the one or more features can include a fracture propagation velocity, a measured depth of propagating fractures, a measured depth fracture overlap between adjacent completion stages, a fracture propagation azimuth, or a combination thereof.

In various embodiments, a system comprises one or more processors and at least one computer-readable storage medium having stored therein instructions. The instructions, which when executed by the one or more processors, can cause the one or more processors to receive strain data associated with a monitoring well that is proximate to a treatment well. The strain data can include information representing a fracturing operation associated with the treatment well. Additionally, the instructions can cause the one or more processors to convert the strain data into image data. A color scale of the image data corresponds to a degree of strain observed by a fiber optic cable deployed in the monitoring well. As follows, the instructions can cause the one or more processors to provide the image data to a machine-learning model, which is configured to identify one or more features in the image data.

In various embodiments, a non-transitory computer-readable storage medium having stored therein instructions which, when executed by one or more processors, cause the one or more processors to receive strain data associated with a monitoring well that is proximate to a treatment well. The strain data can include information representing a fracturing operation associated with the treatment well. Additionally, the instructions can cause the one or more processors to convert the strain data into image data. A color scale of the image data corresponds to a degree of strain observed by a fiber optic cable deployed in the monitoring well. As follows, the instructions can cause the one or more processors to provide the image data to a machine-learning model, which is configured to identify one or more features in the image data.

Turning now to FIG. 1, an example fracturing system 10 is shown. The example fracturing system 10 shown in FIG. 1 can be implemented using the systems, methods, and techniques described herein. In particular, the disclosed system, methods, and techniques may directly or indirectly affect one or more components or pieces of equipment associated with the example fracturing system 10, according to one or more embodiments. The fracturing system 10 includes a fracturing fluid producing apparatus 20, a fluid source 30, a solid source 40, and a pump and blender system 50. All or an applicable combination of these components of the fracturing system 10 can reside at the surface at a well site/fracturing pad where a well 60 is located.

During a fracturing job, the fracturing fluid producing apparatus 20 can access the fluid source 30 for introducing/controlling flow of a fluid, e.g. a fracturing fluid, in the fracturing system 10. While only a single fluid source 30 is shown, the fluid source 30 can include a plurality of separate fluid sources. Further, the fracturing fluid producing apparatus 20 can be omitted from the fracturing system 10. In turn, the fracturing fluid can be sourced directly from the fluid source 30 during a fracturing job instead of through the intermediary fracturing fluid producing apparatus 20.

The fracturing fluid can be an applicable fluid for forming fractures during a fracture stimulation treatment of the well 60. For example, the fracturing fluid can include water, a hydrocarbon fluid, a polymer gel, foam, air, wet gases, and/or other applicable fluids. In various embodiments, the fracturing fluid can include a concentrate to which additional fluid is added prior to use in a fracture stimulation of the well 60. In certain embodiments, the fracturing fluid can include a gel pre-cursor with fluid, e.g. liquid or substantially liquid, from fluid source 30. Accordingly, the gel pre-cursor with fluid can be mixed by the fracturing fluid producing apparatus 20 to produce a hydrated fracturing fluid for forming fractures.

The solid source 40 can include a volume of one or more solids for mixture with a fluid, e.g. the fracturing fluid, to form a solid-laden fluid. The solid-laden fluid can be pumped into the well 60 as part of a solids-laden fluid stream that is used to form and stabilize fractures in the well 60 during a fracturing job. The one or more solids within the solid source 40 can include applicable solids that can be added to the fracturing fluid of the fluid source 30. Specifically, the solid source 40 can contain one or more proppants for stabilizing fractures after they are formed during a fracturing job, e.g. after the fracturing fluid flows out of the formed fractures. For example, the solid source 40 can contain sand.

The fracturing system 10 can also include additive source 70. The additive source 70 can contain/provide one or more applicable additives that can be mixed into fluid, e.g. the fracturing fluid, during a fracturing job. For example, the additive source 70 can include solid-suspension-assistance agents, gelling agents, weighting agents, and/or other optional additives to alter the properties of the fracturing fluid. The additives can be included in the fracturing fluid to reduce pumping friction, to reduce or eliminate the fluid's reaction to the geological formation in which the well is formed, to operate as surfactants, and/or to serve other applicable functions during a fracturing job. As will be discussed in greater detail later, the additives can function to maintain solid particle suspension in a mixture of solid particles and fracturing fluid as the mixture is pumped down the well 60 to one or more perforations.

The pump and blender system 50 functions to pump fracture fluid into the well 60. Specifically, the pump and blender system 50 can pump fracture fluid from the fluid source 30, e.g. fracture fluid that is received through the fracturing fluid producing apparatus 20, into the well 60 for forming and potentially stabilizing fractures as part of a fracture job. The pump and blender system 50 can include one or more pumps. Specifically, the pump and blender system 50 can include a plurality of pumps that operate together, e.g. concurrently, to form fractures in a subterranean formation as part of a fracturing job. The one or more pumps included in the pump and blender system 50 can be an applicable type of fluid pump. For example, the pumps in the pump and blender system 50 can include electric pumps and/or hydrocarbon and hydrocarbon mixture powered pumps. Specifically, the pumps in the pump and blender system 50 can include diesel powered pumps, natural gas powered pumps, and diesel combined with natural gas powered pumps.

The pump and blender system 50 can also function to receive the fracturing fluid and combine it with other components and solids. Specifically, the pump and blender system 50 can combine the fracturing fluid with volumes of solid particles, e.g. proppant, from the solid source 40 and/or additional fluid and solids from the additive source 70. In turn, the pump and blender system 50 can pump the resulting mixture down the well 60 at a sufficient pumping rate to create or enhance one or more fractures in a subterranean zone, for example, to stimulate production of fluids from the zone. While the pump and blender system 50 is described to perform both pumping and mixing of fluids and/or solid particles, in various embodiments, the pump and blender system 50 can function to just pump a fluid stream, e.g. a fracture fluid stream, down the well 60 to create or enhance one or more fractures in a subterranean zone.

The fracturing fluid producing apparatus 20, fluid source 30, and/or solid source 40 may be equipped with one or more monitoring devices (not shown). The monitoring devices can be used to control the flow of fluids, solids, and/or other compositions to the pumping and blender system 50. Such monitoring devices can effectively allow the pumping and blender system 50 to source from one, some or all of the different sources at a given time. In turn, the pumping and blender system 50 can provide just fracturing fluid into the well at some times, just solids or solid slurries at other times, and combinations of those components at yet other times.

Figure 2:
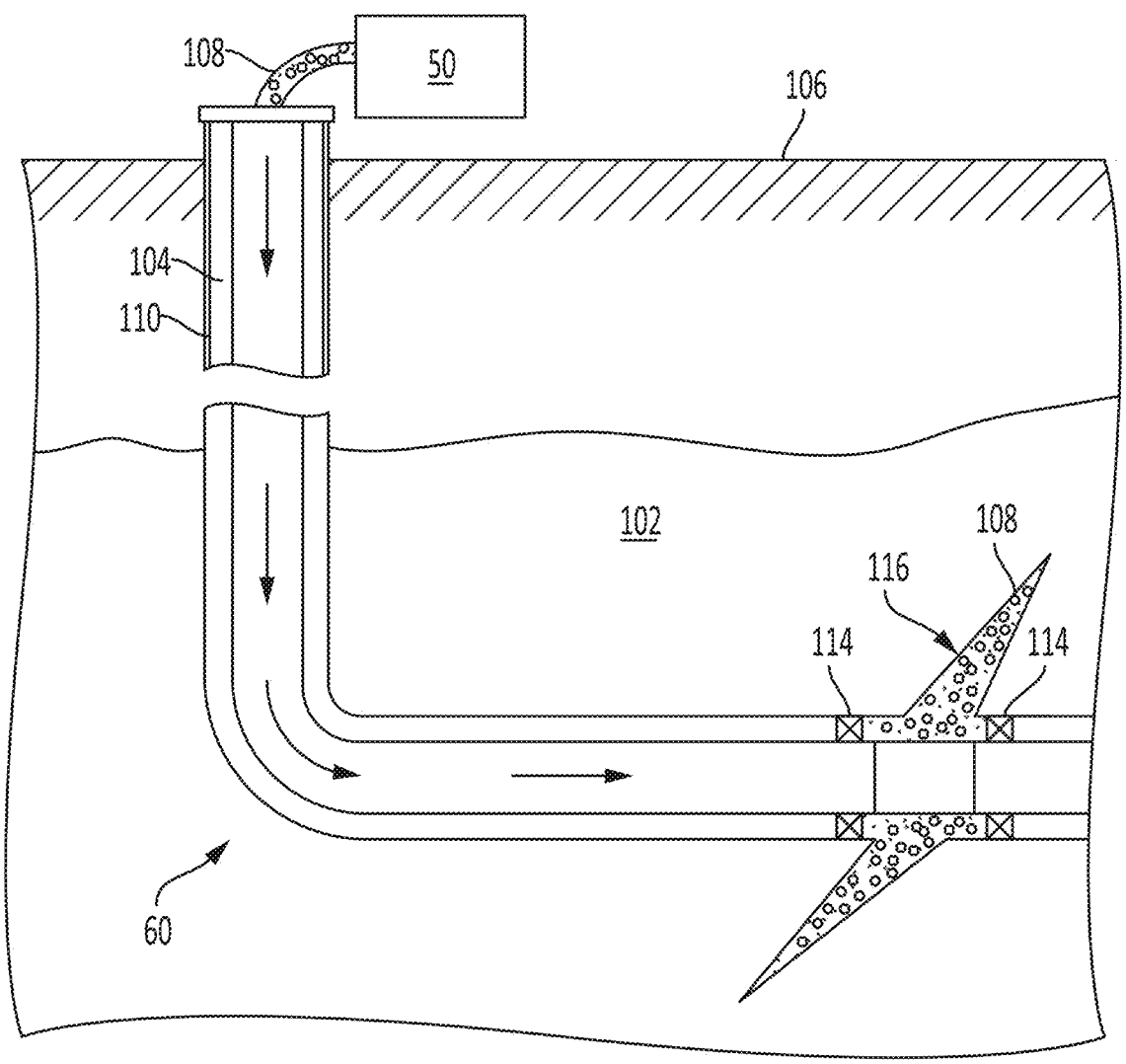
FIG. 2 shows a well during a fracturing operation in a portion of a subterranean formation of interest surrounding a wellbore, in accordance with various aspects of the subject technology.

FIG. 2 shows the well 60 during a fracturing operation in a portion of a subterranean formation of interest 102 surrounding a wellbore 104. The fracturing operation can be performed using one or an applicable combination of the components in the example fracturing system 10 shown in FIG. 1. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore 104. The wellbore 104 can include a casing 110 that is cemented or otherwise secured to the wellbore wall. The wellbore 104 can be uncased or otherwise include uncased sections. Perforations can be formed in the casing 110 to allow fracturing fluids and/or other materials to flow into the subterranean formation 102. As will be discussed in greater detail below, perforations can be formed in the casing 110 using an applicable wireline-free actuation. In the example fracture operation shown in FIG. 2, a perforation is created between points 114.

The pump and blender system 50 is fluidly coupled to the wellbore 104 to pump the fracturing fluid 108, and potentially other applicable solids and solutions into the wellbore 104. When the fracturing fluid 108 is introduced into wellbore 104 it can flow through at least a portion of the wellbore 104 to the perforation, defined by points 114. The fracturing fluid 108 can be pumped at a sufficient pumping rate through at least a portion of the wellbore 104 to create one or more fractures 116 through the perforation and into the subterranean formation 102. Specifically, the fracturing fluid 108 can be pumped at a sufficient pumping rate to create a sufficient hydraulic pressure at the perforation to form the one or more fractures 116. Further, solid particles, e.g. proppant from the solid source 40, can be pumped into the wellbore 104, e.g. within the fracturing fluid 108 towards the perforation. In turn, the solid particles can enter the fractures 116 where they can remain after the fracturing fluid flows out of the wellbore. These solid particles can stabilize or otherwise "prop" the fractures 116 such that fluids can flow freely through the fractures 116.

While only two perforations at opposing sides of the wellbore 104 are shown in FIG. 2, as will be discussed in greater detail below, greater than two perforations can be formed in the wellbore 104, e.g. along the top side of the wellbore 104, as part of a perforation cluster. Fractures can then be formed through the plurality of perforations in the perforation cluster as part of a fracturing stage for the perforation cluster. Specifically, fracturing fluid and solid particles can be pumped into the wellbore 104 and pass through the plurality of perforations during the fracturing stage to form and stabilize the fractures through the plurality of perforations.

Figure 3:
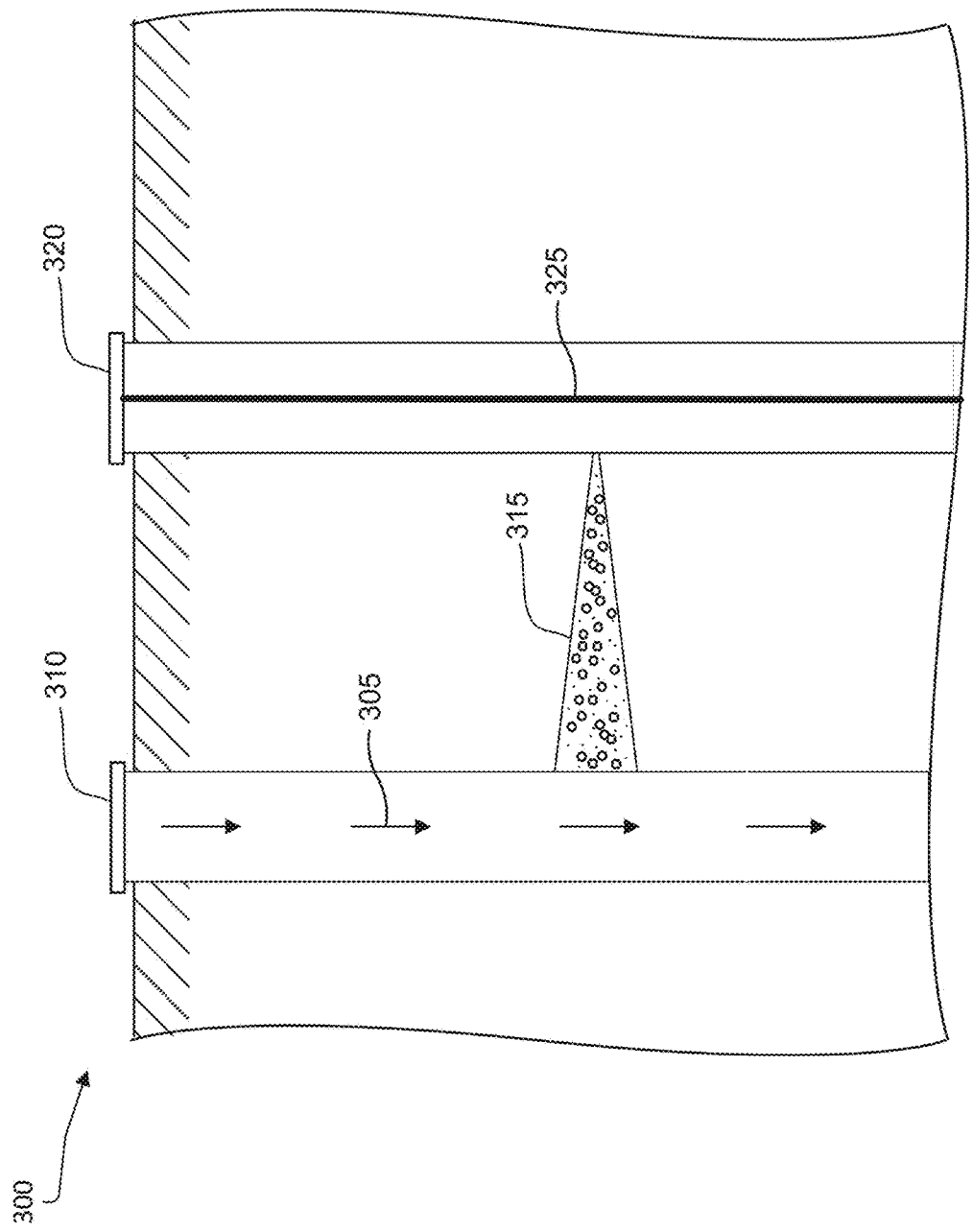
FIG. 3 shows an example of a wellbore environment for an offset well fracture stimulation, in accordance with various aspects of the subject technology.

FIG. 3 shows an example wellbore environment 300 for an offset well hydraulic fracture stimulation. More specifically, wellbore environment 300 includes a treatment well 310 and a monitoring well 320, which is located proximate to treatment well 310.

A fracturing operation of treatment well 310 can be performed in a similar manner as the fracture stimulation treatment of well 60 as described in FIGS. 1 and 2. In some embodiments, fracturing fluid can be pumped into treatment well 310 for forming and potentially stabilizing fractures 315 as part of a fracturing operation. More specifically, a fracture fluid stream 305 can be pumped into treatment well 310 to create or enhance one or more fractures 315 in a subterranean zone. In some examples, fracture fluid stream 305 can include any applicable fracturing fluid (e.g., water, a hydrocarbon fluid, a polymer gel, foam, air, wet gases, etc.), solids, solutions, or additives. As the fracturing fluid is pumped into treatment well 310, with an increase in pressure, fractures 315 extend toward its neighboring well, monitoring well 320.

In some embodiments, monitoring well 320 is equipped with a fiber optic cable 325 for monitoring the stress/strain resulting from the fractures 315 propagating from treatment well 310. As shown in FIG. 3, fiber optic cable 325 can be implemented within monitoring well 320. Fiber optic cable 325 can monitor the fracture developments, more specifically, the change in stress on monitoring well 320 due to the fracture propagation (e.g., increase or decrease in pressure).

According to some aspects, fiber optic cable 325 can house one or more optical fibers. The optical fibers may be single-mode fibers, multi-mode fibers, or a combination of single-mode and multi-mode optical fibers. The fiber optic sensing systems (i.e., Distributed Fiber-Optic Sensing (DFOS) systems) connected to the optical fibers may include Distributed Temperature Sensing (DTS) systems, Distributed Acoustic Sensing (DAS) systems, Distributed Strain Sensing (DSS) systems, quasi-distributed sensing systems where multiple single-point sensors are distributed along an optical fiber (e.g., fiber optic cable 325), or single point sensing systems where the sensors are located at the end of the cable (e.g., fiber optic cable 325).

The fiber optic sensing systems may operate using various sensing principles such as Rayleigh scattering, Brillouin scattering, and Raman scattering. Some examples include, but are not limited to: (1) amplitude-based sensing systems, such as DTS systems based on Raman scattering; (2) phase-sensing-based systems or intensity-sensing-based systems, such as DAS systems based on interferometric sensing using, e.g., homodyne or heterodyne techniques, where the system may sense phase or intensity changes due to constructive or destructive interference, where interferometric signals may be used to detect interferometric signatures and/or processed into time series data and/or frequency/amplitude data and/or other frequency domain data for subsequent processing and filtering where the filtering/processing may generate interferometric signatures; (3) strain-sensing systems, such as DSS systems using dynamic strain measurements based on interferometric sensors or static strain sensing measurements using, e.g., Brillouin scattering; (4) quasi-distributed sensors based on, e.g., Fiber Bragg Gratings (FBGs) where a wavelength shift is detected or multiple FBGs are used to form Fabry-Perot type interferometric sensors for phase or intensity-based sensing; and/or (5) single point fiber-optic sensors based on Fabry-Perot or FBG or intensity based sensors.

In some examples, fiber optic cable 325 can be a Distributed Acoustic Sensing (DAS) system. More specifically, DAS systems use fiber-optic cables to provide distributed acoustic and/or strain sensing. In DAS, the fiber optic cable (e.g., fiber optic cable 325) becomes the sensing element and measurements are made, and in part processed, using an attached optoelectronic device. Such a system allows dynamic measurements caused by acoustic and/or strain signals impacting the optical fiber where frequency and/or amplitude signals can be detected over large distances and in harsh environments. Strain events can be due to mechanical strain and/or thermally induced strain in the optical fiber.

Furthermore, DAS data can be used to determine fluid allocation in real-time as acoustic noise is generated when fluid flows through the casing and in through perforations into the formation. Phase- and intensity-based interferometric sensing systems are sensitive to temperature and mechanical as well as acoustically induced vibrations. Pressure pulses traveling down the wellbore would temporarily change the flow through perforations when the pressure pulse passes by the perforation cluster given a change in pressure across the perforation. Similarly, standing pressure waves can be controlled and moved along the wellbore, and the pressure variation may introduce acoustic and/or mechanical variations in the optical fiber that is being interrogated by the fiber optic sensing systems (e.g., a DAS system or a DSS system). For example, the standing pressure wave can change the pressure across a perforation, which would then allow for location determination and control of the standing wave.

A standing pressure wave can create localized mechanical strain effects and/or acoustic effects that could be coupled or transmitted into the optical fiber being interrogated. In some examples, the data can be time series data (e.g., a 10 km fiber could be interrogated at 10 kHz sampling rate for a DAS system). In other examples, the optical fiber can be interrogated at different sampling rates if other types of sensing systems are used. The location of the standing wave can be identified as a variation in measured signals when compared to other segments of the optical fiber or a variation from a measured baseline where the baseline is measured before the standing wave is introduced.

DAS data can be converted from time-series data to frequency-domain data using Fast Fourier Transforms (FFT), and other transforms like wavelet transforms may also be used to generate different representations of the data. The location of the standing wave can be determined by looking at the frequency content where the presence of higher amplitude frequencies can indicate the location of the standing wave. Also, a standing wave along the wellbore can generate periodic signals in the time series and/or frequency domain data. The location of the standing wave may be correlated to perforations or perforation clusters, and in some instances correlated to other wellbore or completion features (e.g., casing collars or gauge mandrels, etc.).

Various frequency ranges can be used for different purposes and where, e.g., low frequency signal changes may be attributed to formation strain changes or fluid movement and other frequency ranges may be indicative of fluid or gas movement. Various fluids may be introduced to generate boundaries between different fluids such that fluid velocities can be tracked with the DAS system, or different fluids may have different noise profiles, or various materials may be introduced in the fluids as active acoustic noise makers for tracking purposes. DAS data can also be used for microseismic monitoring where small earthquakes (aka micro seismic events) can be triangulated.

Various filtering techniques may be applied to generate indicators of events that may be of interest. Indicators may include, without limitation, formation movement due to growing natural fractures, formation stress changes during the fracturing operations (i.e., stress shadowing), fluid seepage during the fracturing operation as formation movement may force fluid into an observation well, fluid flow from fractures, as well as fluid and proppant flow from frac hits. Each indicator can have a characteristic signature in terms of frequency content and/or amplitude and/or time dependent behavior. A fiber optic cable with a DAS system can include enhanced backscatter optical fibers where Rayleigh backscatter can be increased by 10 times or more with associated increase in Optical Signal-to-Noise Ratio (OSNR).

DAS systems can also be used to detect various seismic events where stress fields and/or growing fracture networks generate microseismic events or where perforation charge events may be used to determine travel time between horizontal wells. As follows, this information can be used from stage to stage to determine changes in travel time as the formation is fractured and filled with fluid and proppant. The DAS systems may also be used with surface seismic sources to generate vertical seismic profiles (VSPs) before, during and after a fracturing job to determine the effectiveness of the fracturing job as well as determine production effectiveness. VSPs and reflection seismic surveys can be used over the life of a well and/or reservoir to track production-related depletion and/or track water, gas, or polymer flood fronts.

There can be various ways to deploy fiber optic cable 325 in monitoring well 320 such as permanent cable installation (e.g., outside of a casing), permanent deployment on tubing, and retrievable/temporary acquisition. The coupling of the cable is critical for measuring the lengthening and contracting of the deployed cable (e.g., extension or compression) as each type can provide variability in the low-frequency strain characteristics observed. In some examples, fiber optic cables can be formed as part of permanently installed sensors in wells. Permanently installed sensors can include fiber optic cables cemented in place in the annular space between the casing and formation. For example, the cable (e.g., fiber optic cable 325) is clamped outside casing (e.g., similar to casing 110 as illustrated in FIG. 2) and cemented in place with adhesive bonding between the cement and the cable. The cable can be protected by centralizers and cross-coupling claims during Run-In-Hole (RIH). Other examples of permanent cable deployment can include tubing conveyed cables.

Further, the cable deployment may be a temporary wireline acquisition with retrievable cables such as a wireline and slickline, or coiled tubing (e.g., cables deployed inside coiled tubing). In other examples, the cable deployment may include retrievable/disposable cables and pumped bare fiber (e.g., Halliburton's ExpressFiber™) is deployed for the duration of a fracturing operation. The disposable cable deployment can rely on an adhesive coating to couple to the horizontal portion of the monitoring well. Additionally, fiber optic cables can be deployed in wells using gravity where a weight or conveyance vehicle is dropped into a wellbore and fiber is released in the well as deployment vehicle moves down the wellbore. The optical fiber can be deployed from the surface or from a coil in the deployment vehicle.

Other types of fiber optic sensors may include point sensors at the surface and/or downhole. Single-point or multi-point pressure and/or temperature sensors can be used in reservoir monitoring applications where the pressure sensors are capable of collecting data at rates up to 2,000 Hz or even higher. A fiber optic cable (e.g., fiber optic cable 325) can be deployed inside a subterranean well based on any of the above-described non-limiting examples of cable deployment.

Figure 4:
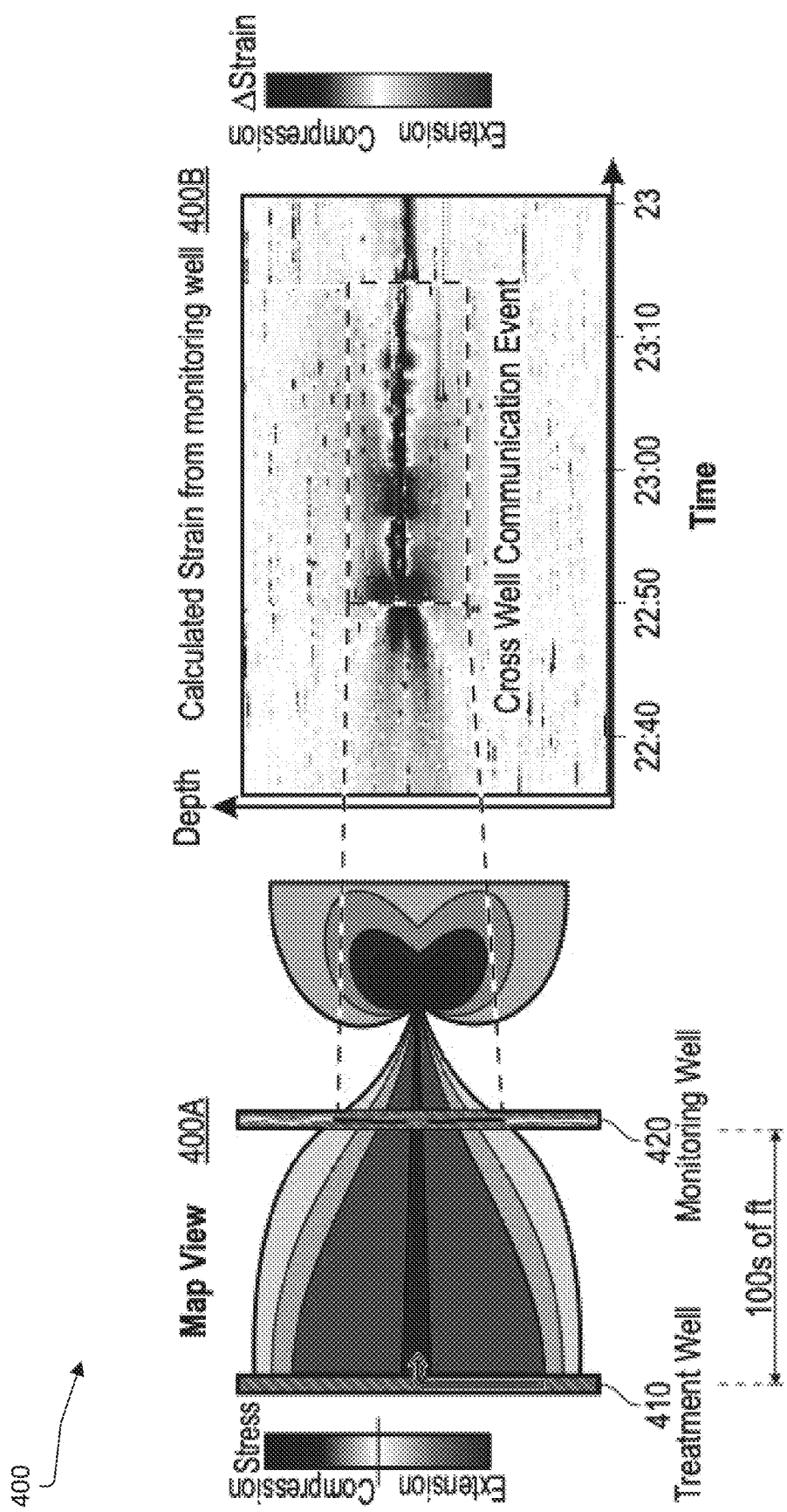
FIG. 4 shows an example of strain data with respect to time and depth in a fracturing operation, in accordance with various aspects of the subject technology.

Additionally, while wellbore environment 300 illustrated in FIG. 3 shows a fiber optic cable deployed within a monitoring well, non-limiting examples of a wellbore environment can include sensor deployment in a treatment well and/or monitoring well(s) to measure well communication. Some characteristics of a treatment well such as pressure, rate, proppant concentration, diverters, fluids, and chemicals can be altered to change the hydraulic fracturing treatment. These changes can impact the formation responses in several different ways, including: (1) stress fields may change, and this may generate microseismic effects that can be measured with DAS systems and/or single point seismic sensors like geophones; (2) fracture growth rates may change and this can generate changes in measured microseismic events and event distributions over time, or changes in measured strain using the low-frequency portion or the DAS signal or Brillouin based sensing systems; (3) pressure changes due to poroelastic effects may be measured in the monitoring well; (4) pressure data may be measured in the treatment well and correlated to formation responses; and/or (5) various changes in treatment rates and pressure may generate events that can be correlated to fracture growth rates. FIG. 4 shows an example illustration of strain data 400 with respect to time and depth in a fracturing operation. More specifically, map view 400A of treatment well 410 and monitoring well 420 illustrates a degree of stress observed by a fiber optic cable (e.g., fiber optic cable 325 as illustrated in FIG. 3) deployed in monitoring well 420. As indicated by a unidirectional arrow in treatment well 410, fracturing fluid is pumped into treatment well 410. Further, fractures propagate outward from treatment well 410 toward monitoring well 420. When fractures interact with monitoring well 420, such a cross-well communication event is called a "frac hit."

Map 400B illustrates the original low-frequency data for strain measurements with respect to time and depth that correspond to map view 400A of treatment well 410 and monitoring well 420. Such strain measurements describe the dynamic stress and strain changes observed by the optic cable deployed in monitoring well 420. In some embodiments, the low-frequency data is DAS data recorded as a 2-dimensional measurement of strain rate with respect to time and depth, as shown in map 400B. For example, DAS data in monitoring well 420 (i.e., offset well) fall in the low-frequency bands and linearly correlate with strain and strain rate induced by dynamic fracture propagation. The recorded DAS data shows a spatiotemporal measure of the lengthening and contraction of the deployed optic cable with frequency content less than 1 Hz. Further, the strain measurements of map 400B can be represented in a color scale (e.g., red and blue) to show the degree of extension and compression observed by monitoring well 420.

Figure 5:
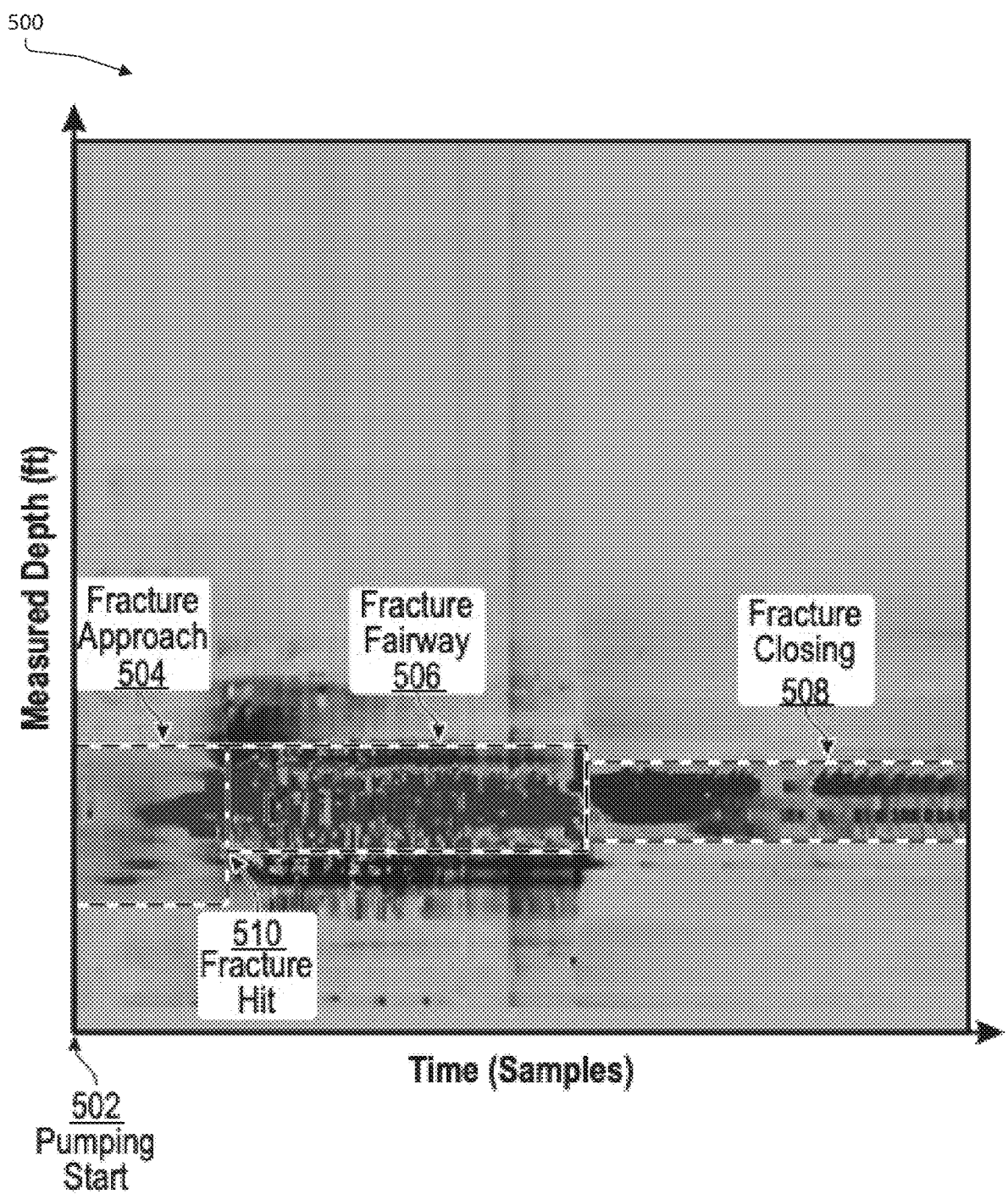
FIG. 5 shows an example of a signal signature representing processed signal data associated with a fracturing operation, in accordance with various aspects of the subject technology.

FIG. 5 shows an example illustration of a signal signature 500 representing processed and scaled low-frequency signal data associated with a fracturing operation in accordance with various aspects of the subject technology. More specifically, signal signature 500 illustrates strain measurement data with respect to time and measured depth, for example, starting from pumping start point 502 and varying with respect to time (samples) and depth (ft).

The low-frequency data as shown in map 400B of FIG. 4 can be, via 2-D signal processing and data scaling, converted into image data as shown in signal signature 500 of FIG. 5. More specifically, the strain data can be integrated over a specified time length/window to convert the strain rate to low-frequency strain. The resultant data can be treated as an image, which is optimal for the 2-D signal process and data scaling. Then, a pre-allocated 2-dimensional array of zero values can be built with a full range of measured depth and a predetermined time range. The pre-allocated zero-valued array of traces (i.e., time increments) and samples (i.e., measured depth-sensing points) can be used in machine learning training to preserve aspect ratio. Accordingly, the low-frequency strain data can be populated in the pre-allocated 2-dimensional array with respect to a pumping onset (e.g., pumping start point 502) when a machine-learning model is applied.

Also, the data may be filtered (e.g., low-pass filtered) to maximize the signal-to-noise ratio. High amplitude traces or samples can skew the statistical nature of the data so their impact can be removed with a filter. A median filter with a pre-defined trace width can be first applied, followed by the removal of the mean on an individual trace basis (e.g., for samples where the absolute value is greater than zero). Also, a singular value decomposition filter can be applied and removes small-scale background noise. Then, the 2-D array can be flattened and scaled such that the mean is 0 and the standard deviation is 1. In some examples where the signal signature is represented in a colored image, the scaled and signal processed 2-D data can be converted into RGB (red, green, and blue) where the color scale is clipped at 3 standard deviations from the mean (for example, time samples*measured depth samples*RGB).

In some embodiments, signal signature 500 can be analyzed to determine different stages of an offset well fracturing stimulation (i.e., strain events) such as fracture approach 504, fracture fairway 506, fracture closing 508, and fracture hit 510. In some examples, strain events locations and time can be captured from dynamic strain measured between a treatment well and a monitoring well. Results can be also analyzed to evaluate the stimulation design (i.e., completion design), well positioning, fracture diagnosis, and identifying geological controls and features. Such variable spatial resolutions can allow the operator to optimally analyze the completion design and its performance and help constrain the fracturing operations based on the complete high-resolution data.

As shown in FIG. 5, fracture approach 504 includes a broad zone with a lower amplitude tensional signal, which propagates toward the fiber optic cable deployed within a monitoring well (i.e., offset well). In some examples, the amplitude of the signal in fracture approach 504 tapers in the measured depth range as fractures approach the fiber optic cable.

Further, fracture fairway 506 includes a higher amplitude tensional signal, which generally has a distinct measured depth zone. In some examples, polarity flips can be observed at various measured depths and times, which are indicative of complex fracture interactions near the fiber optic cable.

Also, fracture closing 508 includes a higher amplitude compressional signal observed following the shutdown of fracturing fluid injection (e.g., pumping the fracturing fluid into the treatment well). As the pumping ends, the pressure decreases, and thus, the fiber and rock formation return to a steady state. In some examples, fracture closing 508 can be short in duration (e.g., a few minutes) or several hours in low leak-off formations.

Furthermore, fracture hit 510 (i.e., frac hit) includes the moment when the fractures intersect with the monitoring well. A change in the polarity and amplitude can be identified at fracture hit 510. Based on the time of the frac hit when the fractures intersect with the monitoring well (i.e., elapsed time since time=0) and the distance between the treatment well and the monitoring well, a bulk fracture propagation velocity can be derived. In some examples, a signal signature of low-frequency signal data can be represented in a colored image where a degree of strain or signals can be shown with various colors and shades. In such examples, a polarity change or an amplitude change can be identified with a change in colors or shades (e.g., from red to blue or vice versa, from black to gray or vice versa, etc.).

Figure 6:
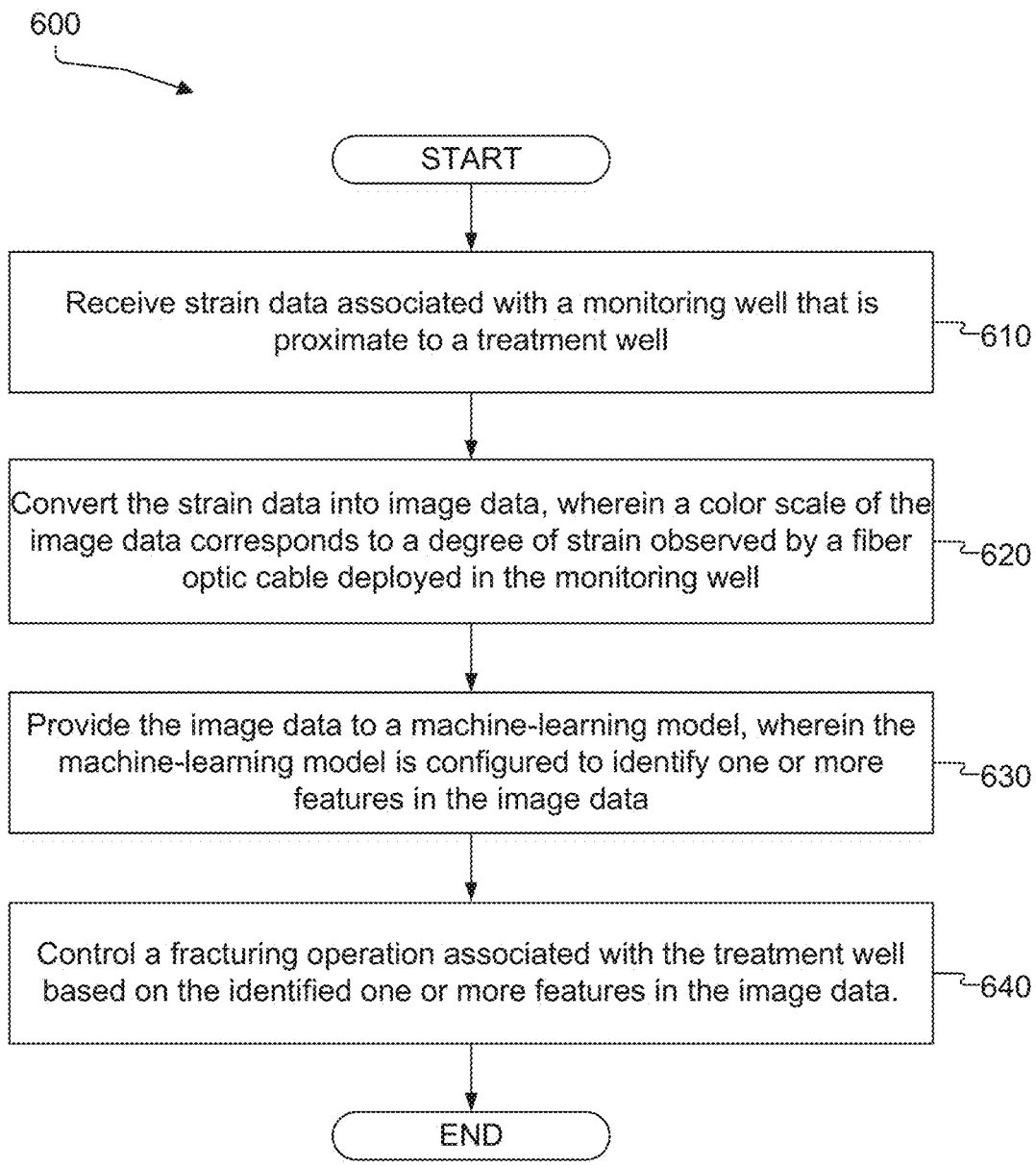
FIG. 6 illustrates an example method for identifying fracture propagation features through machine learning based on low-frequency signal data, in accordance with various aspects of the subject technology.

FIG. 6 shows an example method 600 of determining fracture propagation features through machine learning based on low-frequency signal data, in accordance with various aspects of the subject technology.

In some embodiments, method 600 includes receiving strain data associated with a monitoring well that is proximate to a treatment well at step 610. The strain data comprises information representing a fracturing operation associated with the treatment well. For example, a computing system (e.g., computing device 700 as illustrated below with respect to FIG. 7) can receive strain data associated with monitoring well 320 which is located proximate to treatment well 310 as illustrated in FIG. 3. The strain data comprises information representing a fracturing operation associated with treatment well 310 such as a hydraulic fracturing stimulation.

In some examples, the strain data is a two-dimensional measurement of strain rate with respect to measured depth and time. For example, as illustrated in FIG. 3, fiber optic cable 325 coupled to monitoring well 320 can monitor strain developments resulting from fractures 315 that propagate outward from treatment well 310. As follows, fiber optic cable 325 observes and records the strain data, which is a two-dimensional measurement of strain rate with respect to measured depth and time.

At step 620, method 600 includes converting the strain data into image data, wherein a color scale of the image data corresponds to a degree of strain observed by a fiber optic cable deployed in the monitoring well. For example, a computing system (e.g., computing device 700 as illustrated below with respect to FIG. 7) can convert the strain data into image data. As described previously, in some examples, the image data can be represented in a colored image. In such examples, a color scale of the image data (e.g., RGB) corresponds to a degree of strain observed by fiber optic cable 325 deployed in monitoring well 320 of FIG. 3.

In some embodiments, the fiber optic cable (e.g., fiber optic cable 325 illustrated in FIG. 3) is part of a DAS system. For example, the strain data received at step 610 can be low-frequency DAS data that represent a spatiotemporal measure of the lengthening and contraction of the deployed fiber optic cable.

In some aspects, converting the strain data into the image data can include parsing the strain data to identify different stages of fracture propagation based on the degree of strain observed by the fiber optic cable. For example, different stages of fracture propagation (i.e., strain events) such as fracture approach 504, fracture fairway 506, fracture closing 508, and fracture hit 510 as illustrated in FIG. 5 can be identified based on the degree of strain observed by the fiber optic cable deployed within the monitoring well.

In some examples, converting the strain data into the image data can include integrating the strain data over a predetermined time length. For example, the low-frequency strain data can be integrated over a specified time length to convert strain rate to physical strain.

In some embodiments, converting the strain data into the image data can include applying a sliding window that slides across the entirety of strain data according to a specified depth interval. As described with respect to FIG. 5, a pre-allocated 2-dimensional array can be populated when the absolute time of a stage start (e.g., pumping start point 502 as illustrated in FIG. 5 or a pumping onset). Then, a machine-learning model can be applied to the specified depth intervals (i.e., truncated windows of measured depth) in a sliding window manner, which may match the model input dimensions.

At step 630, method 600 includes providing the image data to a machine-learning model. The machine-learning model is configured to identify one or more features in the image data. For example, a computing system (e.g., computing device 700 as illustrated below with respect to FIG. 7) can provide the image data to a machine-learning model, which is configured to identify one or more features in the image data that are associated with a fracturing operation.

In some embodiments, the machine-learning model is a convolutional neural network, which is designed for object detection. The convolutional neural network can be used for the classification and regression analysis of the image data, which is converted from the strain data. The model can determine simultaneously whether a feature exists in the image data and where it resides in the image (e.g., x, y coordinates).

In some examples, the machine-learning model can identify features related to the fracturing operations by making classification and/or regression predictions. For example, the predictions (i.e., the output of the machine-learning model) can include fracture approach, fracture fairway, fracture closing, and fracture hit, as described above with respect to FIG. 5. In some aspects, each stage/strain event can be annotated with a bounding box with an associated probability indicating the confidence in x, y position, and classification. Accordingly, a variable threshold can be applied to remove predictions that may have a low probability from the returned metadata.

In some aspects, the machine-learning model has been trained using a set of low-frequency strain data collected from one or more fiber optic cables, wherein the one or more fiber optic cables are part of a DAS system. By training a machine learning model with historical low-frequency DAS data that has been carefully annotated, these feature picks can be automated thus providing consistent and real-time optimized deliverables.

At step 640, method 600 includes controlling the fracturing operation associated with the treatment well based on the identified one or more features in the image data. More specifically, a managing application that may locally or remotely operate can control the fracturing operations or the fracture system associated with the treatment well (e.g., fracture system 10 as illustrated in FIG. 1) based on the output of the machine-learning model such as one or more features identified in the image data. As follows, the fracturing system can be optimized by being able to control some parameters and deliverables associated with the fracturing operation of the treatment well.

Further, method 600 can include outputting, via the machine-learning model with the image data as input, the one or more features associated with fracture propagation. In some examples, the features can include a fracture propagation velocity, a measured depth of propagating fractures, a measured depth fracture overlap between adjacent completion stages, a fracture propagation azimuth, or a combination thereof. For example, a computing system (e.g., computing device 700 as illustrated below with respect to FIG. 7) can output, via the machine-learning model, output the bulk fracture propagation metadata or first-order inferences that includes a fracture propagation velocity, a measured depth of propagating fractures, a measured depth fracture overlap between adjacent completion stages, a fracture propagation azimuth, etc.

In some embodiments, the output of the machine-learning model can be provided in real-time locally or transmitted to a cloud environment so that an expert can review the data. Further, based on these features outputted by the machine-learning model, spatiotemporal amplitude and polarity information can be further extracted, which can guide a secondary interpretation with inferences.

Examples of the secondary interpretation can include, within fracture approach, determining the impacts of completion design or number of perforation clusters. If the completion designs and clusters are held constant, any geological implications to the broadness of the fracture approach dimensions can be analyzed. Also, in fracture fairway, a polarity change can be identified (e.g., from extension to compression or vice versa) so that the time and measured depth of the polarity change can be analytically determined. When multiple fiber optic cables are present, based on the time of a fracture hit and consistency of tensional zones of the multiple fibers, fracture propagation distance from completion well stage can be estimated. Further, in fracture closing, temporal amplitude decay gradient on a stage-by-stage basis can be related to reservoir models and formation property estimates can be calibrated.

In some examples, higher frequency microseismic data can be integrated with the low-frequency strain data (e.g., DAS data). As follows, a 4-dimensional display can be generated where a stimulated reservoir volume can be estimated based on the positions of the located microseismic events and the first order approximations of the low-frequency strain (e.g., a fracture propagation velocity, etc.). Also, microseismic event locations (i.e., positions in the 3-D space) can be reduced in their dimensionality and displayed on a strain plot (e.g., signal signature 500 as illustrated in FIG. 5). As follows, based on the location of the microseismic events with respect to fracture fairway (e.g., fracture fairway 506 in signal signature 500 of FIG. 5) that is outputted by a machine-learning model. The microseismic events can be classified as related to fluid transport or stressed fractures failing.

Furthermore, microseismic data can provide information about the fracture failure itself (i.e., focal mechanism). By estimating the focal mechanism for each microseismic event, the information related to the failed fracture's strike and dip with respect to time can be tied to the polarity changes in fracture fairway (e.g., fracture fairway 506 as illustrated in FIG. 5) and time-delayed completion pump data.

Examples of the present technology as described herein can provide the following advantages compared to currently available methods. Detection of fracture propagation events (e.g., a frac hit) has so far remained a manually intensive process that requires a trained analyst to observe the strain data and make a subjective determination, for example selecting bounding boxes to identify the fracture interactions with the monitoring well. Also, as the data is not available to operators until after at least pumping is completed at a particular stage, the post-analysis of the data has made the manual process more time-consuming and laborious, especially in fracturing operations with multiple wells and fiber optic cables. Automated inference analysis through machine learning of the present technology can provide operators with real-time analytics and diagnostics of the fracturing operations in a more efficient, inexpensive, and accurate manner.

Furthermore, the present technology can employ a trained machine learning algorithm to the low-frequency strain data (e.g., DAS data) where the fracture propagation events of interest can be automatically detected and classified with accuracy and consistency in a real-time sense. These events of interest (e.g., fracture approach, fracture fairway, fracture closing, and fracture hit) can be constantly detected by the machine learning algorithm and further displayed for oilfield operators to understand in-situ status of the hydraulic fracture stimulation. As follows, the optimization of the fracturing operation can be achieved by taking real-time actions to change fracturing parameters and deliverables (e.g., a pump rate, pressure, proppant concentration, chemical composition, diverter drop, etc.).

Further, stage-to-stage actions can be taken based on the output/predictions of the machine-learning model. For example, depending on the feature predictions, completion designs (e.g., cluster spacing, perforation density, pumped volume, rate, etc.) can be altered to optimize the fracture operation. The combined model output from multiple systems and models can be also used for determining frac fleet control action.

Also, the present technology utilizes high-resolution low-frequency strain data in an image classification without relying on sliding window amplitude ratios or set thresholds for identifying a fracture hit. The present technology aims to provide not only the instantaneous fracture interaction with the fiber optic cable (i.e., cross-well communication event or a frac hit) but also higher-order information about the hydraulic fracture propagation.

Furthermore, the present technology can be also applicable for strain inversion, which is a physics-based modeling technique that aims to quantify the fracture propagation from a hydraulic fracture completion stage to a DAS-deployed well. The strain inversion would not have been available in real-time without the aid of the trained machine learning model of the present technology. The strain inversion can produce a low-frequency strain waterfall of elapsed time from the start of pumping and measured depth along the fiber optic cable. The purpose of the strain inversion is to estimate in-situ parameters such that the synthetic data can match that of the field-recorded data.

In some examples, inputs to the strain inversion can include spatial positions of a monitoring well equipped with a DAS system and hydraulic fracture completion stage, the number of propagating fractures and their spatial positions, and the formation properties. Using the metadata extracted from the machine learning model as described herein, an estimate of the bulk fracture propagation velocity can aid in calibrating formation properties. Further, the spatiotemporal positions of different stages of the fracture propagation (e.g., fracture approach, fracture fairway, fracture closing, and fracture hit) can help calibrate the strain inversion model and provide a quantitative measure of fracture developments with the hydraulic fracture completion.

Figure 7:
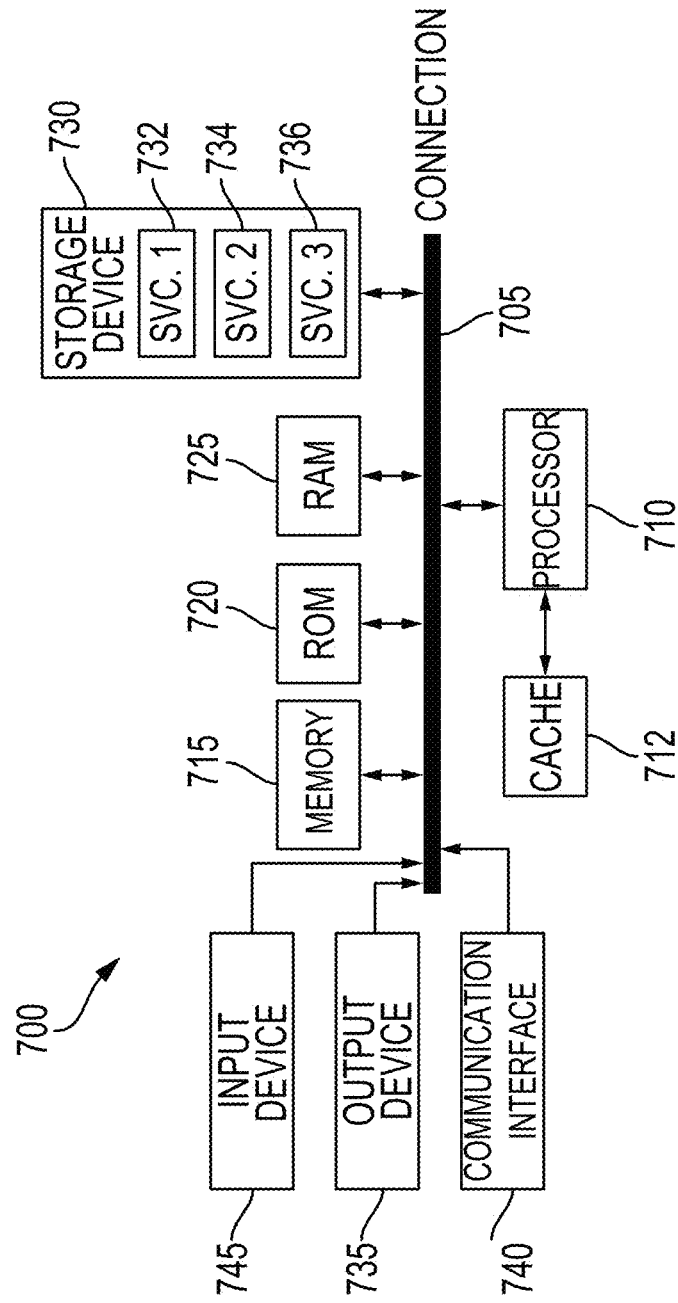
FIG. 7 illustrates an example computing device architecture which can be employed to perform various steps, methods, and techniques disclosed herein.

FIG. 7 illustrates an example computing device architecture 700 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 7 illustrates an example computing device architecture 700 of a computing device which can implement the various technologies and techniques described herein. For example, the components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprising receiving strain data associated with a monitoring well that is proximate to a treatment well. The strain data comprises information representing a fracturing operation associated with the treatment well. The method also includes converting the strain data into image data, wherein a color scale of the image data corresponds to a degree of strain observed by a fiber optic cable deployed in the monitoring well. Further, the method includes providing the image data to a machine-learning model, wherein the machine-learning model is configured to identify one or more features in the image data.

Statement 2. The method of statement 1, further comprising outputting, via the machine-learning model with the image data as input, the one or more features associated with fracture propagation.

Statement 3. The method of statements 1 and 2, further comprising identifying a time when a fracture propagating from the treatment well intersects with the monitoring well.

Statement 4. The method of statements 1 through 3, wherein the fiber optic cable is part of a distributed acoustic sensing (DAS) system.

Statement 5. The method of statements 1 through 4, wherein the strain data is a two-dimensional measurement of strain rate with respect to measured depth and time.

Statement 6. The method of statements 1 through 5, wherein converting the strain data into the image data comprises parsing the strain data to identify different stages of fracture propagation based on the degree of strain observed by the fiber optic cable.

Statement 7. The method of statements 1 through 6, wherein converting the strain data into the image data comprises integrating the strain data over a predetermined time length.

Statement 8. The method of statements 1 through 7, wherein converting the strain data into the image data comprises applying a sliding window that slides across the strain data according to a specified depth interval.

Statement 9. The method of statements 1 through 8, wherein the machine-learning model has been trained using a set of low-frequency strain data collected from one or more fiber optic cables, wherein the one or more fiber optic cables are part of a DAS system.

Statement 10. The method of statements 1 through 9, wherein the one or more features include a fracture propagation velocity, a measured depth of propagating fractures, a measured depth fracture overlap between adjacent completion stages, a fracture propagation azimuth, or a combination thereof.

Statement 11. A system comprising one or more processors and at least one computer-readable storage medium having stored therein instructions. The instructions, when executed by the one or more processors, cause the one or more processors to receive strain data associated with a monitoring well that is proximate to a treatment well. The strain data comprises information representing a fracturing operation associated with the treatment well. Further, the instructions cause the one or more processors to convert the strain data into image data, wherein a color scale of the image data corresponds to a degree of strain observed by a fiber optic cable deployed in the monitoring well. Additionally, the instructions cause the one or more processors to provide the image data to a machine-learning model, wherein the machine-learning model is configured to identify one or more features in the image data.

Statement 12. The system of statement 11, wherein the instructions, when executed by the one or more processors, cause the one or more processors to output, via the machine-learning model with the image data as input, the one or more features associated with fracture propagation Statement 13. The system of statements 11 and 12, wherein the instructions, when executed by the one or more processors, cause the one or more processors to identify a time when a fracture propagating from the treatment well intersects with the monitoring well.

Statement 14. The system of statements 11 through 13, wherein the instructions to convert the strain data into the image data comprises parsing the strain data to identify different stages of fracture propagation based on the degree of strain observed by the fiber optic cable.

Statement 15. The system of statements 11 through 14, wherein the instructions to convert the strain data into the image data comprises integrating the strain data over a predetermined time length.

Statement 16. A non-transitory computer-readable storage medium comprising computer-readable instructions, which when executed by a computing system, cause the computing system to receive strain data associated with a monitoring well that is proximate to a treatment well. The strain data comprises information representing a fracturing operation associated with the treatment well. Further, the instructions cause the computing system to convert the strain data into image data, wherein a color scale of the image data corresponds to a degree of strain observed by a fiber optic cable deployed in the monitoring well. Additionally, the instructions cause the computing system to provide the image data to a machine-learning model, wherein the machine-learning model is configured to identify one or more features in the image data.

Statement 17. The non-transitory computer-readable storage medium of statement 16, wherein the instructions, which when executed by the computing system, further cause the computing system to output, via the machine-learning model with the image data as input, the one or more features associated with fracture propagation.

Statement 18. The non-transitory computer-readable storage medium of statements 16 and 17, wherein the instructions, which when executed by the computing system, further cause the computing system to identify a time when a fracture propagating from the treatment well intersects with the monitoring well.

Statement 19. The non-transitory computer-readable storage medium of statements 16 through 18, wherein the instructions to convert the strain data into the image data comprises parsing the strain data to identify different stages of fracture propagation based on the degree of strain observed by the fiber optic cable.

Statement 20. The non-transitory computer-readable storage medium of statements 16 through 19, wherein the instructions to convert the strain data into the image data comprises integrating the strain data over a predetermined time length.

What is claimed is:

1. A method comprising:
   receiving strain data associated with a monitoring well that is proximate to a treatment well, wherein the strain data comprises information representing a fracturing operation associated with the treatment well;
   converting the strain data into image data, wherein a color scale of the image data corresponds to a degree of strain observed by a fiber optic cable deployed in the monitoring well; and
   providing the image data to a machine-learning model, wherein the machine-learning model is configured to identify one or more features in the image data.

2. The method of claim 1, further comprising:
   outputting, via the machine-learning model with the image data as input, the one or more features associated with fracture propagation.

3. The method of claim 1, further comprising:
   identifying a time when a fracture propagating from the treatment well intersects with the monitoring well.

4. The method of claim 1, wherein the fiber optic cable is part of a distributed acoustic sensing (DAS) system.

5. The method of claim 1, wherein the strain data is a two-dimensional measurement of strain rate with respect to measured depth and time.

6. The method of claim 1, wherein converting the strain data into the image data comprises parsing the strain data to identify different stages of fracture propagation based on the degree of strain observed by the fiber optic cable.

7. The method of claim 1, wherein converting the strain data into the image data comprises integrating the strain data over a predetermined time length.

8. The method of claim 1, wherein converting the strain data into the image data comprises applying a sliding window that slides across the strain data according to a specified depth interval.

9. The method of claim 1, wherein the machine-learning model has been trained using a set of low-frequency strain data collected from one or more fiber optic cables, wherein the one or more fiber optic cables are part of a DAS system.

10. The method of claim 1, wherein the one or more features include a fracture propagation velocity, a measured depth of propagating fractures, a measured depth fracture overlap between adjacent completion stages, a fracture propagation azimuth, or a combination thereof.

11. A system comprising:
    one or more processors; and
    a computer-readable medium comprising instructions stored therein, which when executed by the one or more processors, cause the one or more processors to:
       receive strain data associated with a monitoring well that is proximate to a treatment well, wherein the strain data comprises information representing a fracturing operation associated with the treatment well;
       convert the strain data into image data, wherein a color scale of the image data corresponds to a degree of strain observed by a fiber optic cable deployed in the monitoring well; and
       provide the image data to a machine-learning model, wherein the machine-learning model is configured to identify one or more features in the image data.

12. The system of claim 11, wherein the instructions, which when executed by the one or more processors, further cause the one or more processors to:
    output, via the machine-learning model with the image data as input, the one or more features associated with fracture propagation.

13. The system of claim 11, wherein the instructions, which when executed by the one or more processors, further cause the one or more processors to:
    identify a time when a fracture propagating from the treatment well intersects with the monitoring well.

14. The system of claim 11, wherein the instructions to convert the strain data into the image data comprises parsing the strain data to identify different stages of fracture propagation based on the degree of strain observed by the fiber optic cable.

15. The system of claim 11, wherein the instructions to convert the strain data into the image data comprises integrating the strain data over a predetermined time length.

16. A non-transitory computer-readable storage medium comprising computer-readable instructions, which when executed by a computing system, cause the computing system to:
    receive strain data associated with a monitoring well that is proximate to a treatment well, wherein the strain data comprises information representing a fracturing operation associated with the treatment well;
    convert the strain data into image data, wherein a color scale of the image data corresponds to a degree of strain observed by a fiber optic cable deployed in the monitoring well; and
    provide the image data to a machine-learning model, wherein the machine-learning model is configured to identify one or more features in the image data.

17. The non-transitory computer-readable storage medium of claim 16, wherein the instructions, which when executed by the computing system, further cause the computing system to:
    output, via the machine-learning model with the image data as input, the one or more features associated with fracture propagation.

18. The non-transitory computer-readable storage medium of claim 16, wherein the instructions, which when executed by the computing system, further cause the computing system to:
  identify a time when a fracture propagating from the treatment well intersects with the monitoring well.

19. The non-transitory computer-readable storage medium of claim 16, wherein the instructions to convert the strain data into the image data comprises parsing the strain data to identify different stages of fracture propagation based on the degree of strain observed by the fiber optic cable.

20. The non-transitory computer-readable storage medium of claim 16, wherein the instructions to convert the strain data into the image data comprises integrating the strain data over a predetermined time length.

* * * * *